(12) United States Patent
Ganti et al.

(10) Patent No.: US 12,500,820 B2
(45) Date of Patent: Dec. 16, 2025

(54) SMART DETECTION FOR DETERMINATION OF DATABASE ACCURACY

(71) Applicant: ServiceNow, Inc., Santa Clara, CA (US)

(72) Inventors: Aparna Ganti, Santa Clara, CA (US); Lilia Manguy, Santa Clara, CA (US); Akhilesh Kashyap Kittane Ravikumar, Kirkland, WA (US); Siyou Li, Kirkland, WA (US); Kavitha Kotti, Kirkland, WA (US); Shijin Joshua, San Diego, CA (US); Anthony Walter Branton, Kirkland, WA (US); Luc John Johnson, Kirkland, WA (US); Ganesh Bhattarai, San Diego, CA (US); Hnin Haymar, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 132 days.

(21) Appl. No.: 17/948,781

(22) Filed: Sep. 20, 2022

(65) Prior Publication Data
US 2024/0097992 A1    Mar. 21, 2024

(51) Int. Cl.
*H04L 41/16* (2022.01)
*G06N 5/02* (2023.01)
(Continued)

(52) U.S. Cl.
CPC ............ *H04L 41/16* (2013.01); *G06N 5/027* (2013.01); *H04L 41/0866* (2013.01); *H04L 41/0894* (2022.05)

(58) Field of Classification Search
CPC . H04L 41/16; H04L 41/0894; H04L 41/0866; G06N 5/027
See application file for complete search history.

(56) References Cited

U.S. PATENT DOCUMENTS

| 4,941,084 A | 7/1990 | Terada et al. |
| 5,185,860 A | 2/1993 | Wu |

(Continued)

FOREIGN PATENT DOCUMENTS

| EP | 0433979 | 6/1991 |
| EP | 1607824 | 12/2005 |

(Continued)

OTHER PUBLICATIONS

D. Lin, An Information-Theoretic Definition of Similarity, Proceedings of the Fifteenth International Conference on Machine Learning, pp. 296-304, 1998.

(Continued)

*Primary Examiner* — Amy Ng
*Assistant Examiner* — Anthony G Gemignani
(74) *Attorney, Agent, or Firm* — McDonnell Boehnen 1Hulbert & Berghoff LLP

(57) ABSTRACT

Persistent storage may contain definitions of: configuration items (CIs) each having attributes that characterize a respective hardware or software component, a list of data sources used to update at least some of the CIs, and an auto-attestation time period; and one or more processors configured to: identify a plurality of the CIs for auto-attestation; for each respective CI, determine a respective condition of whether: (i) a data-source attribute of the respective CI indicates that it was updated by a trusted data source, and (ii) a most-recent-update attribute of the respective CI indicates that it was updated within the auto-attestation time period; and mark each respective CI based on its respective condition, wherein the respective CI is marked as auto-attested when its respective condition is true, and wherein the respective CI is marked as not auto-attested when its respective condition is false.

20 Claims, 11 Drawing Sheets

(51) Int. Cl.
*H04L 41/0866* (2022.01)
*H04L 41/0894* (2022.01)

(56) References Cited

U.S. PATENT DOCUMENTS

| | | | |
|---|---|---|---|
| 5,237,518 A | 8/1993 | Sztipanovits et al. | |
| 5,261,097 A | 11/1993 | Saxon | |
| 5,265,252 A | 11/1993 | Rawson, III et al. | |
| 5,367,685 A | 11/1994 | Gosling | |
| 5,390,297 A | 2/1995 | Barber et al. | |
| 5,442,791 A | 8/1995 | Wrabetz et al. | |
| 5,452,415 A | 9/1995 | Hotka | |
| 5,522,042 A | 5/1996 | Fee et al. | |
| 5,533,116 A | 7/1996 | Vesterinen | |
| 5,655,081 A | 8/1997 | Bonnell et al. | |
| 5,659,736 A | 8/1997 | Hasegawa et al. | |
| 5,671,412 A | 9/1997 | Christiano | |
| 5,696,701 A | 12/1997 | Burgess et al. | |
| 5,715,463 A | 2/1998 | Merkin | |
| 5,745,879 A | 4/1998 | Wyman | |
| 5,761,502 A | 6/1998 | Jacobs | |
| 5,764,913 A | 6/1998 | Jancke et al. | |
| 5,887,139 A | 3/1999 | Madison, Jr. et al. | |
| 5,909,217 A | 6/1999 | Bereiter | |
| 5,937,165 A | 8/1999 | Schwaller et al. | |
| 5,949,976 A | 9/1999 | Chappelle | |
| 5,978,594 A | 11/1999 | Bonnell et al. | |
| 6,021,437 A | 2/2000 | Chen et al. | |
| 6,041,347 A | 3/2000 | Harsham et al. | |
| 6,088,717 A | 7/2000 | Reed et al. | |
| 6,101,500 A | 8/2000 | Lau | |
| 6,128,016 A | 10/2000 | Coelho et al. | |
| 6,131,118 A | 10/2000 | Stupek, Jr. et al. | |
| 6,134,581 A | 10/2000 | Ismael et al. | |
| 6,138,122 A | 10/2000 | Smith et al. | |
| 6,148,335 A | 11/2000 | Haggard et al. | |
| 6,166,732 A | 12/2000 | Mitchell et al. | |
| 6,167,448 A | 12/2000 | Hemphill et al. | |
| 6,175,866 B1 | 1/2001 | Holloway et al. | |
| 6,175,878 B1 | 1/2001 | Seaman et al. | |
| 6,260,050 B1 | 7/2001 | Yost et al. | |
| 6,263,457 B1 | 7/2001 | Anderson et al. | |
| 6,272,150 B1 | 8/2001 | Hrastar et al. | |
| 6,336,138 B1 | 1/2002 | Caswell et al. | |
| 6,363,421 B2 | 3/2002 | Barker et al. | |
| 6,393,386 B1 | 5/2002 | Zager et al. | |
| 6,397,245 B1 | 5/2002 | Johnson, II et al. | |
| 6,434,626 B1 | 8/2002 | Prakash et al. | |
| 6,438,592 B1 | 8/2002 | Killian | |
| 6,456,306 B1 | 9/2002 | Chin et al. | |
| 6,466,932 B1 | 10/2002 | Dennis et al. | |
| 6,487,590 B1 | 11/2002 | Foley et al. | |
| 6,505,248 B1 | 1/2003 | Casper et al. | |
| 6,526,442 B1 | 2/2003 | Stupek, Jr. et al. | |
| 6,621,823 B1 | 9/2003 | Mellquist et al. | |
| 6,707,795 B1 | 3/2004 | Noorhosseini et al. | |
| 6,742,015 B1 | 5/2004 | Bowman-Amuah | |
| 6,763,380 B1 | 7/2004 | Mayton et al. | |
| 6,816,898 B1 | 11/2004 | Scarpelli et al. | |
| 6,895,586 B1 | 5/2005 | Brasher et al. | |
| 6,948,175 B1 | 9/2005 | Fong et al. | |
| 6,985,901 B1 | 1/2006 | Sachse et al. | |
| 7,003,564 B2 | 2/2006 | Greuel et al. | |
| 7,028,228 B1 | 4/2006 | Lovy et al. | |
| 7,043,537 B1 | 5/2006 | Pratt | |
| 7,043,661 B2 | 5/2006 | Valadarsky et al. | |
| 7,062,683 B2 | 6/2006 | Warpenburg et al. | |
| 7,096,459 B2 | 8/2006 | Keller et al. | |
| 7,146,574 B2 | 12/2006 | Goldthwaite et al. | |
| 7,197,466 B1 | 3/2007 | Peterson et al. | |
| 7,215,360 B2 | 5/2007 | Gupta | |
| 7,216,304 B1 | 5/2007 | Gourdol et al. | |
| 7,222,147 B1 | 5/2007 | Black et al. | |
| 7,281,170 B2 | 10/2007 | Taylor et al. | |
| 7,412,502 B2 | 8/2008 | Fearn et al. | |
| 7,505,872 B2 | 3/2009 | Keller et al. | |
| 7,593,013 B2 | 9/2009 | Agutter et al. | |
| 7,596,716 B2 | 9/2009 | Frost et al. | |
| 7,617,073 B2 | 11/2009 | Trinon et al. | |
| 7,660,731 B2 | 2/2010 | Chaddha et al. | |
| 7,676,294 B2 | 3/2010 | Baier et al. | |
| 7,676,437 B2 | 3/2010 | Satkunanathan et al. | |
| 7,840,490 B1 | 11/2010 | Sellers et al. | |
| 7,877,783 B1 | 1/2011 | Cline et al. | |
| 7,890,869 B1 | 2/2011 | Mayer et al. | |
| 7,966,398 B2 | 6/2011 | Wiles, Jr. | |
| 8,060,396 B1 | 11/2011 | Bessler et al. | |
| 8,196,210 B2 | 6/2012 | Sterin | |
| 8,321,948 B2 | 11/2012 | Robinson et al. | |
| 8,407,669 B2 | 3/2013 | Yee et al. | |
| 8,554,750 B2 | 10/2013 | Rangarajan et al. | |
| 8,595,647 B2 | 11/2013 | Sabin et al. | |
| 8,620,818 B2 | 12/2013 | Hughes et al. | |
| 8,646,093 B2 | 2/2014 | Myers et al. | |
| 8,674,992 B2 | 3/2014 | Poston et al. | |
| 8,725,647 B2 | 5/2014 | Disciascio et al. | |
| 9,053,460 B2 | 6/2015 | Gilbert et al. | |
| 10,673,963 B1 | 6/2020 | Feiguine et al. | |
| 10,749,943 B1 | 8/2020 | Feiguine et al. | |
| 10,771,344 B2 | 9/2020 | Bitterfeld et al. | |
| 10,824,650 B2 | 11/2020 | Bar Oz et al. | |
| 10,944,654 B2 | 3/2021 | Rimar et al. | |
| 11,089,115 B2 | 8/2021 | Garty et al. | |
| 11,095,506 B1 | 8/2021 | Erblat et al. | |
| 2002/0116340 A1 | 8/2002 | Hellberg et al. | |
| 2002/0133584 A1 | 9/2002 | Greuel et al. | |
| 2002/0158969 A1 | 10/2002 | Gupta | |
| 2003/0118087 A1 | 6/2003 | Goldthwaite et al. | |
| 2003/0200293 A1 | 10/2003 | Fearn et al. | |
| 2004/0243260 A1* | 12/2004 | Law | G06Q 10/10 |
| | | | 700/86 |
| 2005/0015217 A1 | 1/2005 | Weidl et al. | |
| 2005/0091356 A1 | 4/2005 | Izzo | |
| 2005/0262076 A1* | 11/2005 | Voskuil | G06F 8/65 |
| 2006/0026453 A1 | 2/2006 | Frost et al. | |
| 2006/0095461 A1 | 5/2006 | Raymond | |
| 2006/0179058 A1 | 8/2006 | Bram et al. | |
| 2006/0293942 A1 | 12/2006 | Chaddha et al. | |
| 2007/0033279 A1 | 2/2007 | Battat et al. | |
| 2007/0188494 A1 | 8/2007 | Agutter et al. | |
| 2007/0288389 A1 | 12/2007 | Vaughan et al. | |
| 2008/0133289 A1 | 6/2008 | Armour et al. | |
| 2008/0148253 A1 | 6/2008 | Badwe et al. | |
| 2008/0319779 A1 | 12/2008 | Hughes et al. | |
| 2009/0088875 A1 | 4/2009 | Baier et al. | |
| 2009/0228984 A1 | 9/2009 | Sterin | |
| 2010/0110932 A1 | 5/2010 | Doran et al. | |
| 2018/0123940 A1 | 5/2018 | Rimar et al. | |
| 2018/0365435 A1* | 12/2018 | Anandam | H04L 63/0884 |
| 2019/0104398 A1 | 4/2019 | Owen et al. | |
| 2019/0268310 A1* | 8/2019 | Guberman | H04L 67/10 |
| 2020/0050689 A1 | 2/2020 | Tal et al. | |
| 2020/0204443 A1 | 6/2020 | Bar Oz et al. | |
| 2021/0194764 A1 | 6/2021 | Badyan et al. | |
| 2022/0029886 A1 | 1/2022 | Hameiri et al. | |

FOREIGN PATENT DOCUMENTS

| | | | | |
|---|---|---|---|---|
| JP | 2004062892 A | * | 2/2004 | ......... H04L 41/0893 |
| WO | WO 99/34285 | | 7/1999 | |
| WO | WO 00/52559 | | 9/2000 | |
| WO | WO 01/79970 | | 10/2001 | |
| WO | WO-2011131752 A1 | * | 10/2011 | ............... G01D 9/40 |
| WO | WO-2021224895 A1 | * | 11/2021 | ......... G06K 9/00221 |

OTHER PUBLICATIONS

M. Ankerst, M. M. Breunig, H.-P. Kriegel, J. Sander, OPTICS: Ordering Points To Identify the Clustering Structure, Proceedings of the 1999 ACM SIGMOD International Conference on Management of Data, pp. 49-60, 1999.

(56) References Cited

OTHER PUBLICATIONS

ServiceNow, Tokyo Now Platform Capabilities, Sep. 2, 2022 (downloaded from Internet).

* cited by examiner

SMART DETECTION FOR DETERMINATION OF DATABASE ACCURACY

BACKGROUND

As more and more technological processes become data-driven, the importance of maintaining accurate information relating to these processes has increased accordingly. A configuration management database (CMDB) is typically used to maintain a set of configuration items representing hardware and software components deployed on a network, as well as the relationships between these configuration items. Higher-layer applications may rely on the information in the CMDB when carrying out various management and maintenance tasks on the network as well as other operations. Therefore, the accuracy of this information is important for the proper operation of such tasks. Nonetheless, the configuration items in a CMDB can easily become obsolete or out of date.

SUMMARY

The embodiments herein overcome these and possibly other limitations of the state of the art by applying auto-attestation (smart detection) techniques to configuration items in a CMDB. In particular, if a configuration item has been recently updated (e.g., in the last one or more days or weeks) by a trusted data source, the configuration item is presumed to be accurate. A user is then given an opportunity to attest to (confirm) the accuracies of some or all such configuration items in bulk. Any remaining configuration items may be flagged or otherwise marked as being unattested. These unattested configuration items may be inaccurate, possibly representing hardware or software components that have been modified, moved, retired from service, or were never in the network to begin with. The user may be given a further opportunity to either manually indicate the accuracy (or inaccuracy) of these remaining configuration items one at a time or in groups.

Advantageously, this allows the user to rapidly identify inaccurate configuration items that should be updated (thereby increasing the accuracy of the CMDB as a whole) or removed from the CMDB (also increasing the accuracy of the CMDB while also reducing its memory utilization). Increasing the accuracy of the CMDB can facilitate proper operation of applications that rely on the CMDB. Reducing the memory utilization of the CMDB can improve the performance of CMDB operations (e.g., search, updating, editing, etc.) as well as those of applications that rely on the CMDB.

Accordingly, a first example embodiment may involve persistent storage containing definitions of: configuration items (CIs) each having attributes that characterize a respective hardware or software component deployed on one or more networks, a list of data sources used to update at least some of the CIs, and an auto-attestation time period. The first example embodiment may also involve one or more processors configured to: identify a plurality of the CIs for auto-attestation; for each respective CI of the plurality of the CIs, determine a respective condition of whether: (i) a data-source attribute of the respective CI indicates that it was updated by a trusted data source as indicated by the list of data sources, and (ii) a most-recent-update attribute of the respective CI indicates that it was most recently updated within the auto-attestation time period; mark each respective CI based on its respective condition, wherein the respective CI is marked as auto-attested when its respective condition is true, and wherein the respective CI is marked as not auto-attested when its respective condition is false; and provide, to a client device, a representation of one or more graphical user interfaces allowing a user of the client device to review the respective CIs marked as auto-attested and the respective CIs marked as not auto-attested.

A second example embodiment may involve identifying, by one or more processors, a plurality of configuration items (CIs) for auto-attestation, wherein persistent storage contains definitions of: the CIs each having attributes that characterize a respective hardware or software component deployed on one or more networks, a list of data sources used to update at least some of the CIs, and an auto-attestation time period; for each respective CI of the plurality of the CIs, determining, by the one or more processors, a respective condition of whether: (i) a data-source attribute of the respective CI indicates that it was updated by a trusted data source as indicated by the list of data sources, and (ii) a most-recent-update attribute of the respective CI indicates that it was most recently updated within the auto-attestation time period; marking, by the one or more processors, each respective CI based on its respective condition, wherein the respective CI is marked as auto-attested when its respective condition is true, and wherein the respective CI is marked as not auto-attested when its respective condition is false; and providing, by the one or more processors and to a client device, a representation of one or more graphical user interfaces allowing a user of the client device to review the respective CIs marked as auto-attested and the respective CIs marked as not auto-attested.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
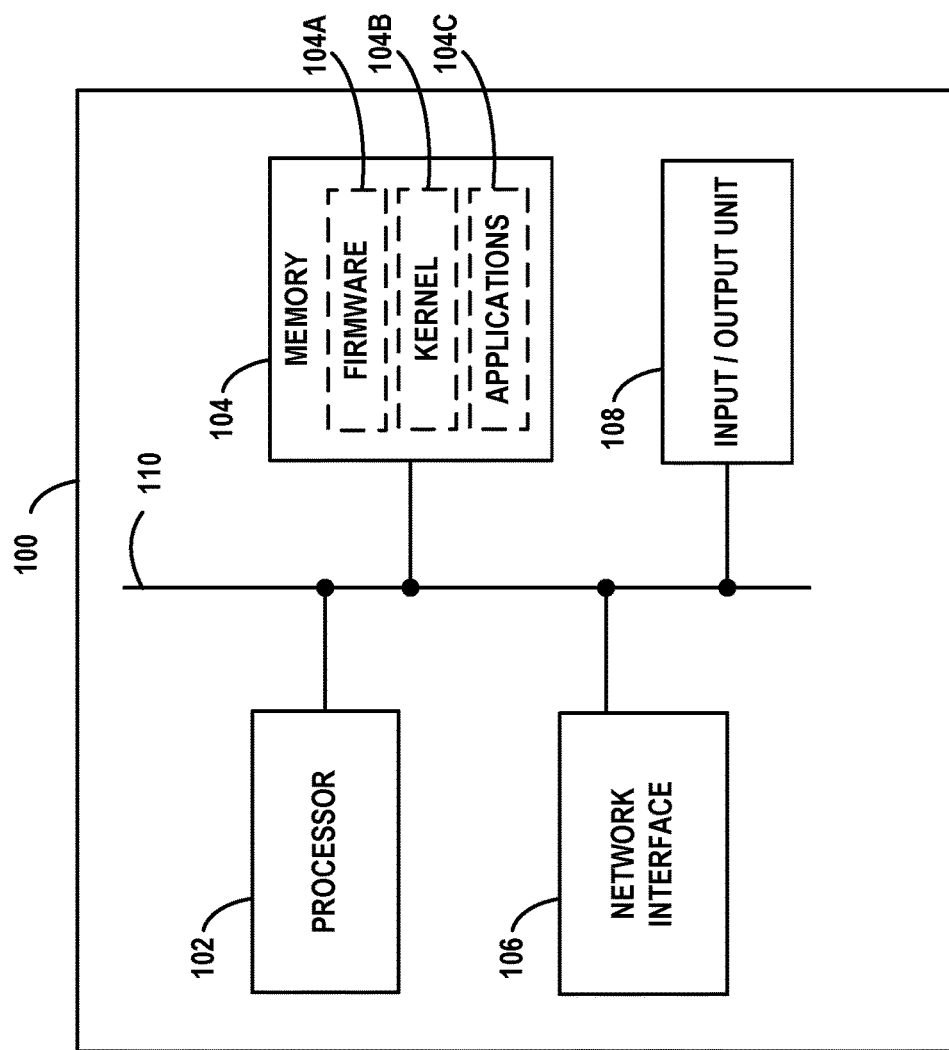
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® bytecode) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
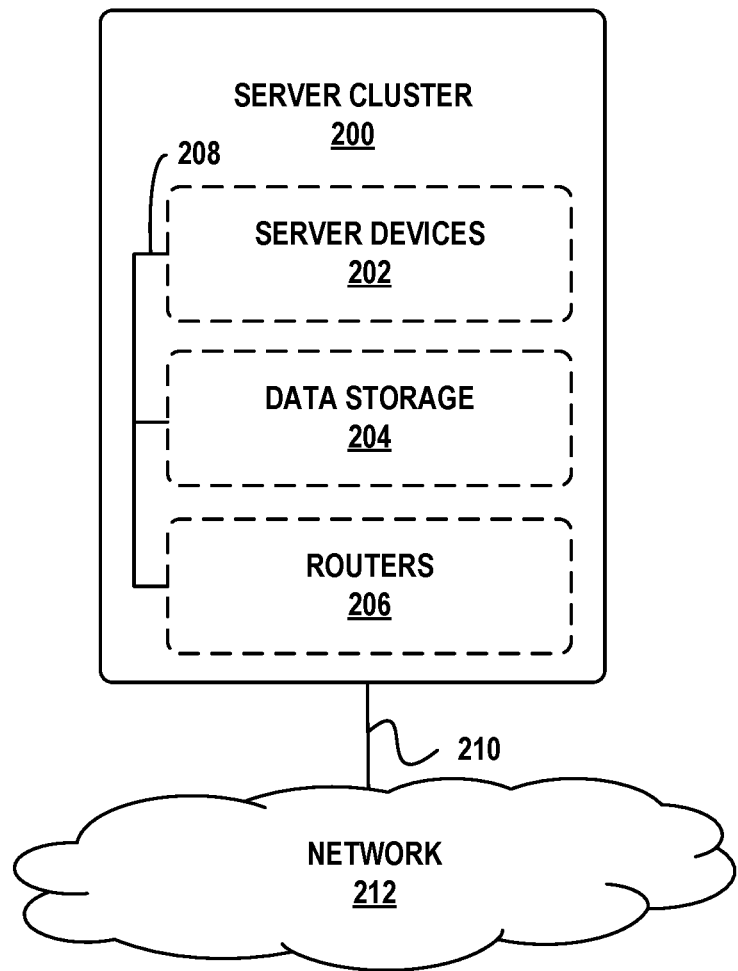
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the eXtensible Markup Language (XML), or some other standardized or proprietary format. Moreover, server devices 202 may have the capability of executing various types of computerized scripting languages, such as but not limited to Perl, Python, PUP Hypertext Preprocessor (PUP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
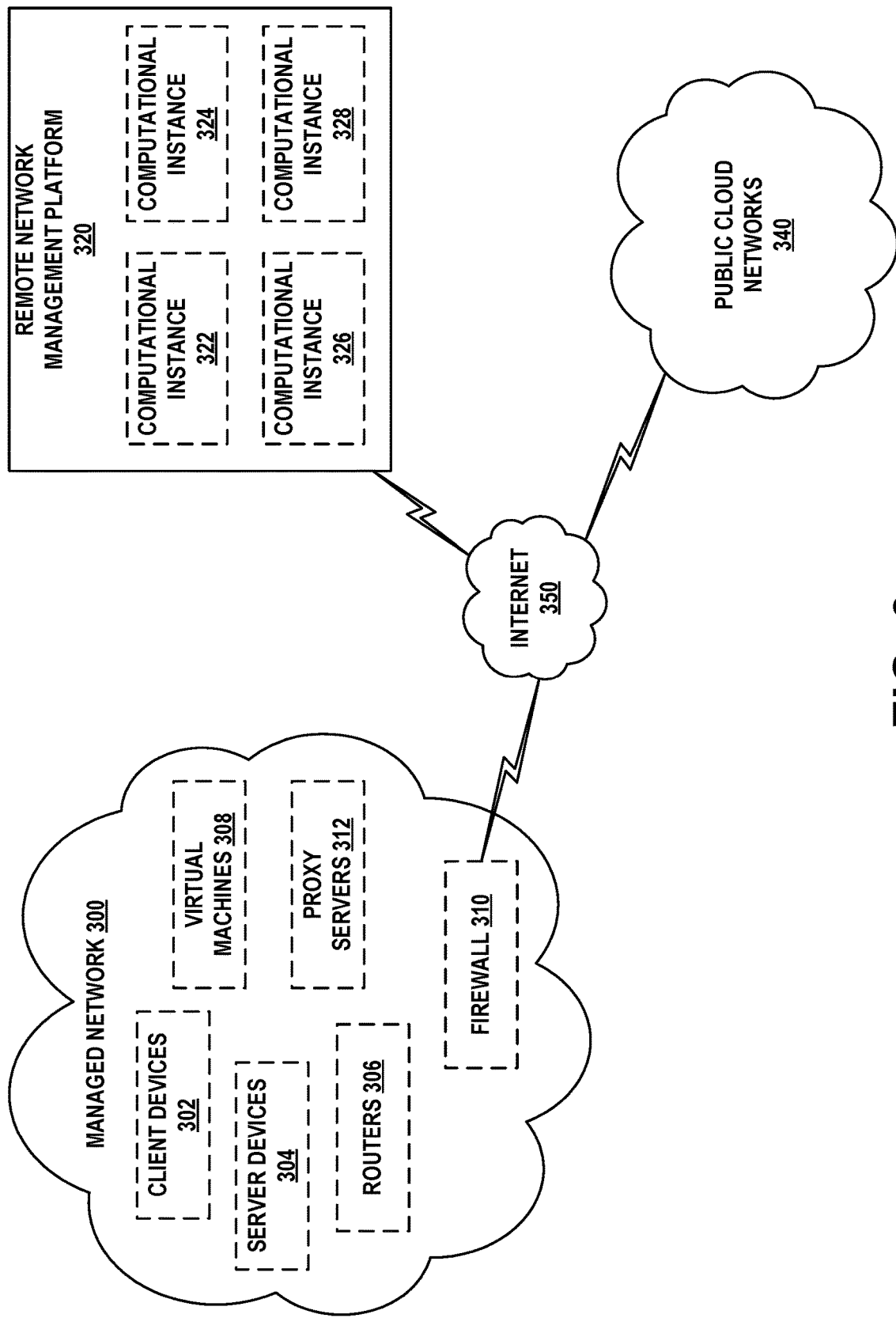
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
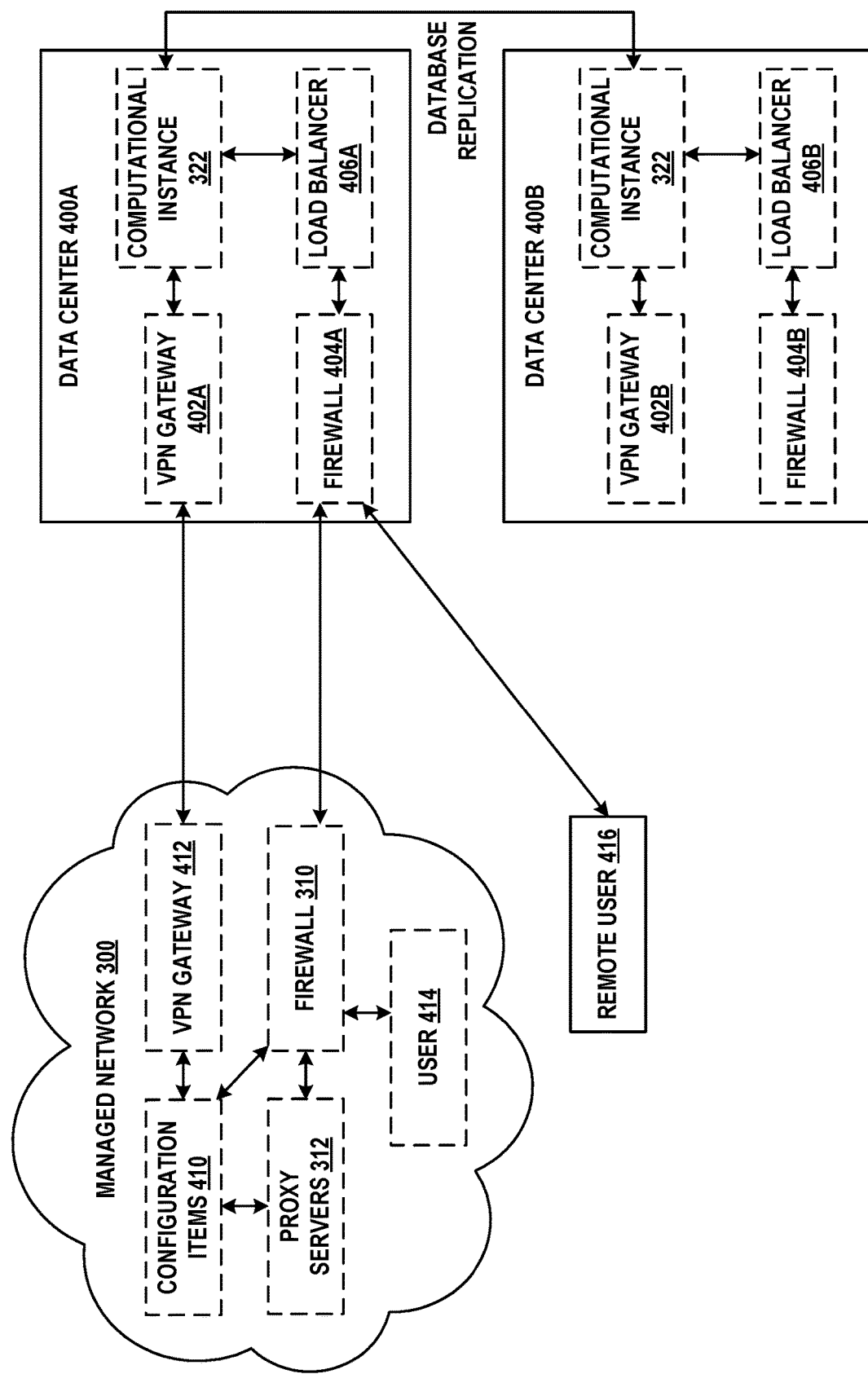
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. EXAMPLE DISCOVERY

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
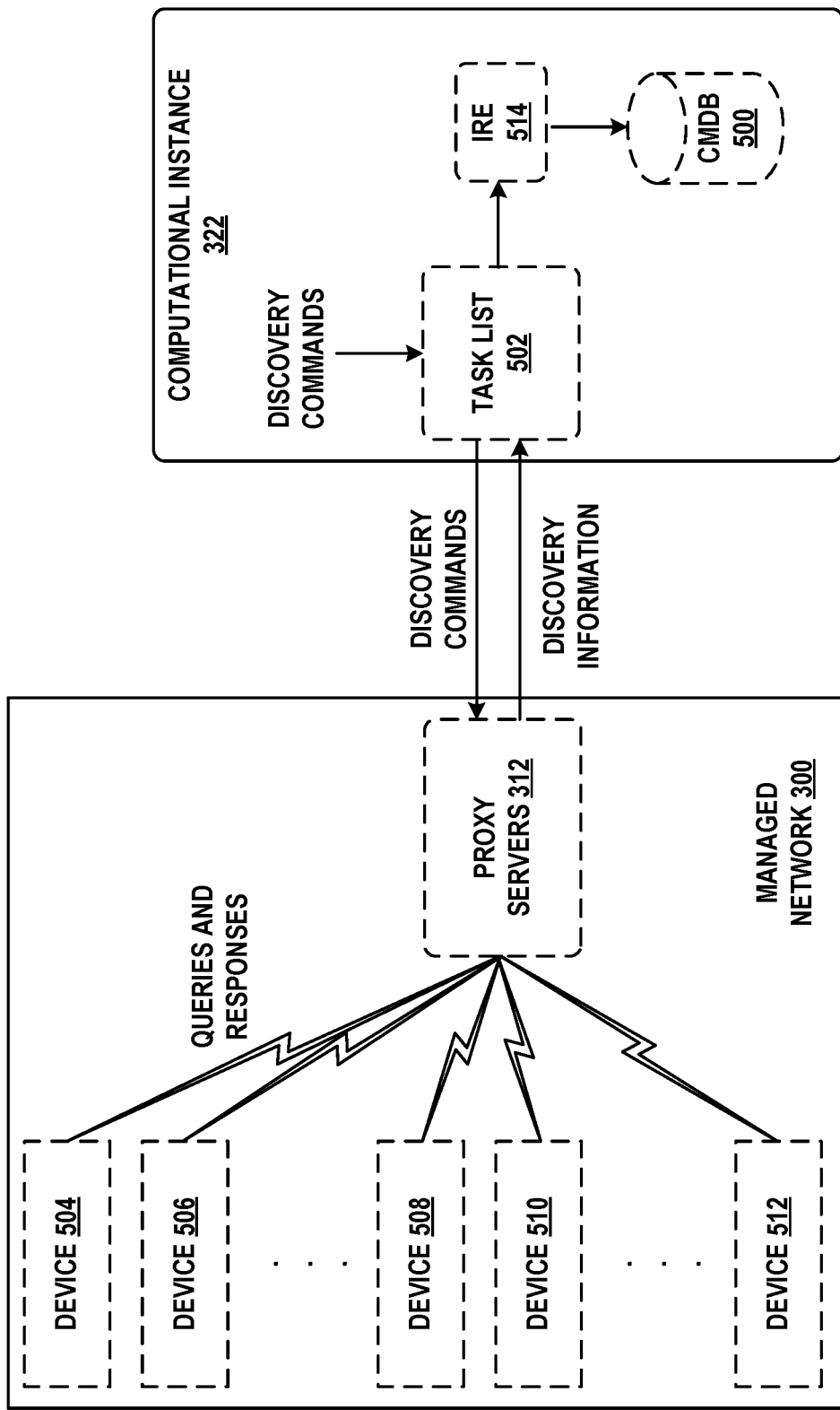
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery—horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases—under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB IDENTIFICATION RULES AND RECONCILIATION

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. ATTESTATION OF CONFIGURATION ITEMS

As noted, a CMDB can be populated with configuration items by multiple data sources (a CMDB can also be analogously populated by relationships between these configuration items, but the following discussion will focus just on configuration items for sake of simplicity). Examples of such data sources include, but are not limited to, discovery procedures, configuration files, manual entries, trusted third-party discovery tools, and/or untrusted third-party discovery tools.

Herein, the term "update" and analogous terms may be used to indicate that a configuration item was initially written to the CMDB or subsequently modified in the CMDB. Thus, an "update" to a configuration item may be the configuration item first being stored in the CMDB or any later change to the configuration item. On the other hand, "deleting" a configuration item involves removing the configuration item from the CMDB, or at least freeing the memory used to store the configuration item in the CMDB.

Discovery procedures may include horizontal and/or vertical discovery in line with the discussion above. Configuration files place configuration items and their associated attributes in a form that can be read into a CMDB, such as comma-separated values (CSV). Manual entry takes place when a configuration item is updated in the CMDB by way of human interaction (e.g., by way of a graphical user interface provided by a computational instance). Trusted third-party discovery tools are those that use approved and/or verified techniques (e.g., using certified service graph connectors) for discovering configuration items and then mapping and writing them properly to the CMDB. Untrusted third-party discovery tools do not use approved techniques to verify their configuration item discovery or mappings.

Generally speaking, updating the CMDB is a cumulative process in which configuration items are added to the CMDB but rarely if ever removed. For instance, when discovery is carried out (e.g., once a day, week, month, etc.), new configuration items that are discovered (i.e., configuration items that were not previously in the CMDB) are added to the CMDB, and existing configuration items (i.e., configuration items that were previously in the CMDB) are updated as needed. These updates may make use of TRE, with attributes of the configuration items being overwritten with their latest values.

However, configuration items that were previously in the CMDB, but not present in an update from a data source, are left in the CMDB. This is because the hardware and or software corresponding to these configuration items might be temporarily unavailable (e.g., being rebooted, moved, or under maintenance) or because the data source could have could have omitted the configuration items due to an error (e.g., a misconfiguration of discovery). Thus, automatically deleting such undiscovered configuration items would potentially be harmful, as those configuration items might still exist in the operational environment (e.g., a managed network and/or one or more public cloud network accounts). On the other hand, an undiscovered configuration item sometimes represents hardware or software that has been permanently removed from service. As a consequence, a CMDB often includes some number of "stale" configuration items that should be removed because they represent hardware or software that is no longer (or never was) in the operational environment.

Information from each of the multiple data sources that provide configuration items to the CMDB may have a different level trust reflecting its expected accuracy. For example, horizontal and vertical discovery procedures and trusted third-party discovery tools may be considered to be trusted sources, because they verify the existence and reachability of configuration items and/or at least force configuration items to be updated in the CMDB in an approved and predictable fashion. On the other hand, configuration files, manual entry, and third-party software may be considered to be untrusted sources because they might not be able to guarantee that such enforcement of verification or consistency was employed.

As the CMDB may contain configuration items provided by data sources that are trusted and untrusted, the quality and accuracy of the CMDB can vary dramatically over the course of time. As noted above, stale configuration items naturally occur in the CMDB because of changes in the operational environment and the cumulative nature of CMDB updating. Another source of stale configuration items might be an untrusted data source that introduces incorrect configuration item information into the CMDB (e.g., due to misconfiguration or typographical errors).

Manually identifying stale configuration items for a CMDB with more than a relatively small size does not scale. For example, making a determination of whether a configuration item is stale may require that a person reviews and confirms the existence (or non-existence) of the associated hardware or software in the operational environment. This could involve physically inspecting the hardware or software, such as viewing a server device in a data center or logging on to a server device to determine whether a software application is installed thereon. If the configuration item is found and its information is deemed correct, then its CMDB record can be updated to indicate that its presence and/or operation has been verified. Otherwise, the configuration item may be deemed to be stale, marked for deletion, and eventually deleted from the CMDB. This verification process is called attestation.

Some CMDBs have grown to include tens of millions of configuration items (or even more). Thus, the problem of attestation has grown in magnitude as well. For these larger CMDBs, it is not possible to physically attest to each and every configuration item such that the CMDB can be reviewed and updated as needed in a reasonable time frame—in other words, these large CMDBs are updated so frequently and with such a volume of configuration items that manual attestation cannot keep up.

Furthermore, having too many stale configuration items in a CMDB is problematic. The memory requirements of a CMDB (in terms of both disk storage and RAM) grows with the number of configuration items in the CMDB. Searching a CMDB is a common and frequently performed operation, and the more configuration items in the CMDB the slower these searches. Additionally, having stale configuration items in a CMDB means that the CMDB data is inaccurate (at least for these stale configuration items), which can cause applications that rely on CMDB integrity to fail or to produce incorrect results.

As a consequence, it is desirable to be able to attest to as many configuration items as possible in an automated fashion. This can dramatically reduce the amount of manual attestation required, and thereby lead to the rapid removal of stale configuration items from the CMDB. Such removal reduces memory utilization, speeds searching, and improves the correctness of the CMDB.

The embodiments herein provide techniques for such automated attestation (smart detection) that go beyond operations that are currently performed manually. In particular, configuration items that have been provided to the CMDB by a trusted data source and within a predetermined time period are presumed to be accurate. These configuration items are marked as auto-attested. The remaining configuration items that have not been auto-attested are marked as such. Other attestation processes can then be used to determine whether these remaining configuration items that were not auto-attested are stale. Configuration items found to be not stale (e.g., by way of manual verification) are marked as attested, and stale configuration items may be marked as rejected for subsequent deletion.

Auto-attestation may involve the establishment of a list of trusted data sources (e.g., discovery procedures and trusted third-party discovery tools), as well as an auto-attestation time period (e.g., 7 days, 30 days, 90 days). When these trusted data sources update a configuration item in CMDB, they may identify themselves in an attribute of the configuration item. For example, configuration items may include a data_source attribute that indicates which data source of a list thereof that was used to most recently update the configuration item. Alternatively, the data_source attribute could be a Boolean or alphanumeric value that indicates that the most recent update was from a trusted data source. Configuration items may also include most_recent_update attribute that is a timestamp indicating when the configuration item was most recently updated. Notably, these attribute names as for purposes of example—attributes with the same or similar function make be given different names.

With these attributes in place, the configuration items of the CMDB are scanned, one by one. For each, if the data_source attribute indicates that the most recent update to the configuration item was from a trusted data source, and the most_recent_update attribute has a time stamp that is within the predetermined time period, the configuration item is marked as auto-attested. If these conditions are not true, the configuration item is not auto-attested. Configuration items that are not auto-attested may subsequently be manually attested, or marked as rejected and possibly deleted from the CMDB.

Figure 6:
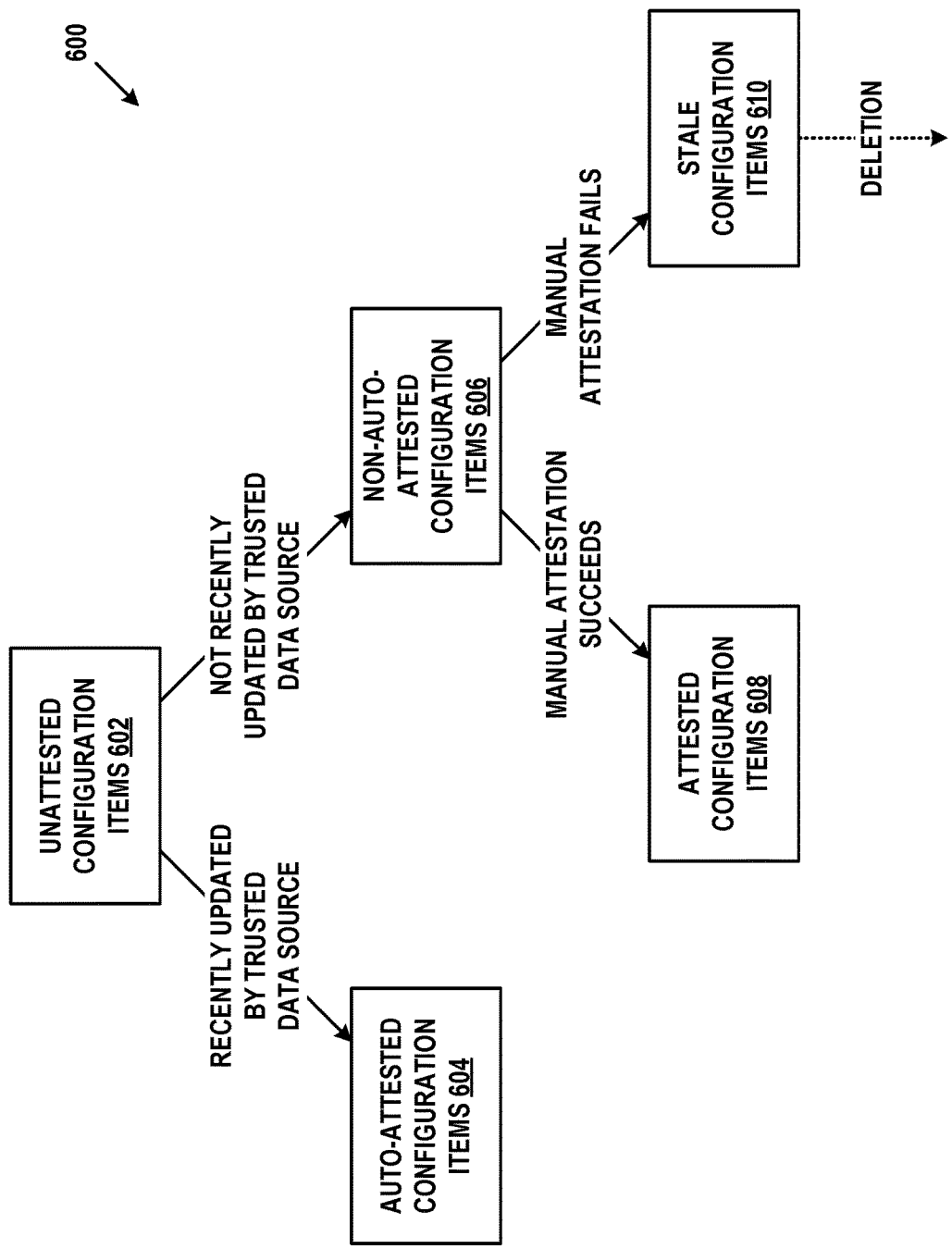
FIG. 6 depicts possible outcomes of auto-attestation of configuration items, in accordance with example embodiments.

FIG. 6 depicts an example visual illustration 600 of this process. Block 602 represents unattested configuration items. For instance, at the beginning of attestation procedures, some or all configuration items may be considered to be unattested. Block 604 represents auto-attested configuration items—those that were recently updated by a trusted source. Block 606 represents non-auto-attested configuration items—those that were not recently updated by a trusted source. Block 608 represents manually attested configuration items. In some cases, the auto-attested and manually attested configuration items may be grouped together (e.g., with an attestation attribute of each such configuration item indicating that it was attested) or may remain distinct (e.g., with an attestation attribute of each such configuration item indicating that it was automatically or manually attested). Block 610 represents stale configuration items for which manual attestation failed. As indicated by the dotted arrow, these stale configuration items may be deleted.

For most real-world operational environments, the vast majority of configuration items can be auto-attested. Thus, the embodiments herein dramatically reduce the amount of manual attestation required, making it significantly easier to remove stale configuration items from the CMDB. As a result of these embodiments, CMDB memory utilization can be reduced.

The embodiments also allow auto-attestation to focus on or be limited to certain types, classes, or locations of configuration items. For example, an enterprise might only be concerned with attesting configuration items representing hardware components in its main office, as CMDB inaccuracies in other types and locations of configuration items might be deemed to be an acceptable risk. Thus, the configuration items subject to auto-attestation might be filtered in various ways.

Furthermore, auto-attestation may be implemented as multiple jobs—multiple independently-executing instances of a software application—that operate on distinct groupings of configuration items. For example, each configuration item may have a managed by attribute that indicates the user or group of users who are responsible for the hardware or software represented by the configuration item. This allows the management of configuration items to be split by location, configuration item type or class, etc. In order to only report about the attestation of relevant configuration items to each of these users or groups of users, one auto-attestation job per managed by value may be performed.

Figure 7:
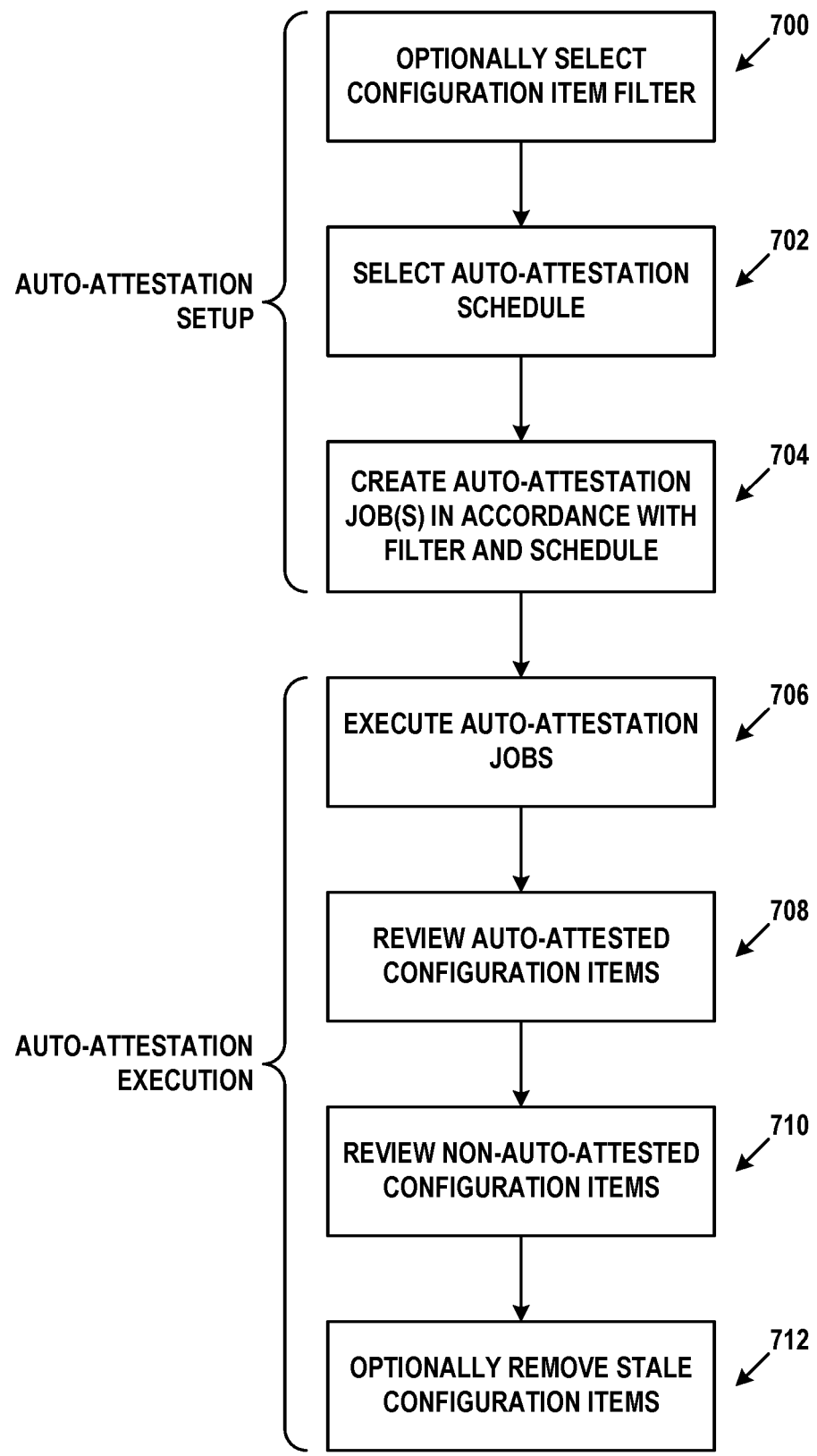
FIG. 7 depicts a process for auto-attestation of configuration items, in accordance with example embodiments.

FIG. 7 puts auto-attestation setup and execution procedures together into a flow chart. Blocks 700, 702, and 704 refer to auto-attestation setup procedures, and blocks 706, 708, 710, and 712 refer to auto-attestation execution procedures.

Block 700 may involve optionally selecting a configuration item filter. As noted, such a filter may separate configuration items for which auto-attestation will not be performed from configuration items for which auto-attestation will be performed. This filter might use configuration item attributes such as configuration item type or class, location, time in service, DNS domain, IP address, model number, serial number, or status, for example. In some cases, a regular expression or other pattern matching technique may be used on one or more of these attributes to filter at a more granular level (e.g., all IP addresses of the form 192.168.0.*, where the * is a wildcard value that by convention matches any integer from 0-255).

Block 702 may involve selecting an auto-attestation schedule, which specifies a frequency at which auto-attestation will execute. Typically, this frequency may be on the order of weeks or months but other frequencies may be selected. Also, frequency may be selected so that the time period between auto-attestation executions is greater than or less than the predetermined time period that defines a "recent" configuration item update.

Block 704 may involve creating one or more auto-attestation jobs in accordance with the specified filter (if applicable) and schedule. As noted, multiple jobs may be created based on managed_by attribute value, e.g., such that all configuration items with the same managed_by attribute value are in the same job.

Block 706 may involve executing the auto-attestation jobs created at block 704. Thus, one or more jobs may be launched and execute serially or at least partially in parallel.

Each job may perform auto-attestation on a non-overlapping set of configuration items. Notably, each configuration item that has been recently updated by a trusted data source may be auto-attested (conversely, auto-attestation may occur for any configuration item that was recently updated by a data source that is not on a list of one or more untrusted data sources). Here, determining whether a configuration item has been "recently updated" may involve determining whether a timestamp stored in the most_recent_update attribute of the configuration item is within the pre-determined time period (e.g., the last 7 days, 30 days, or 90 days). Also, determining whether a configuration item has been updated by a trusted data source may involve determining whether the data_source attribute references or otherwise indicates a data source that has been designated as trusted (e.g., horizontal or vertical discovery, or a trusted third-party discovery tool).

Figure 9A:
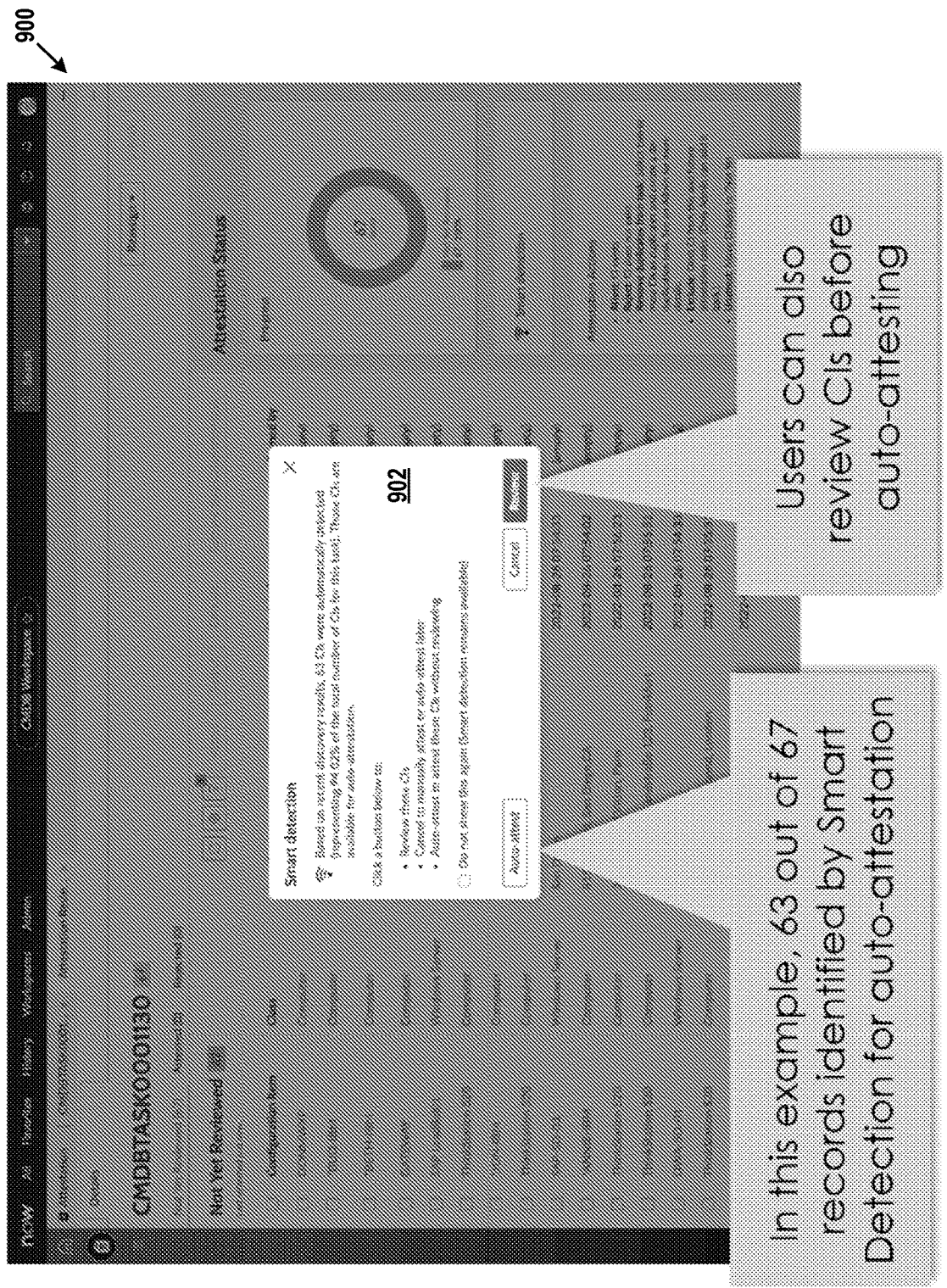
FIG. 9A depicts a graphical user interface, in accordance with example embodiments.

Block 708 may involve review of auto-attested configuration items. For example, a list of these configuration items may be presented to a user, and the user may be given options to review the list of configuration items in detail, cancel the auto-attestation, or accept the auto-attestation without review. A graphical user interface facilitating such operations is shown in FIG. 9A, below.

Figure 9B:
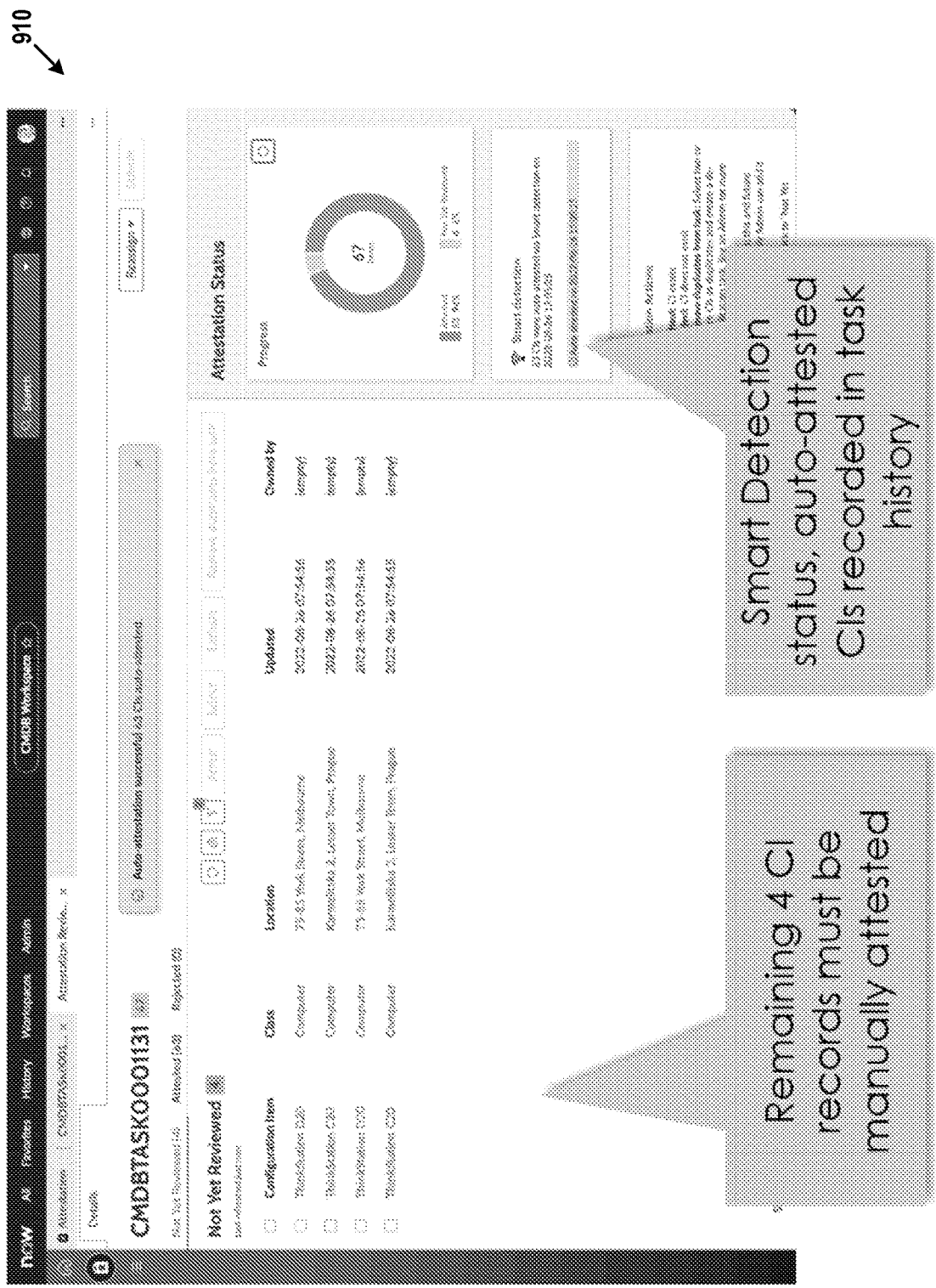
FIG. 9B depicts a graphical user interface, in accordance with example embodiments.

Block 710 may involve review of non-auto-attested configuration items. For example, a list of these configuration items may be presented to a user, and the user may be given options to either manually attest each configuration item or leave it unattested. A graphical user interface facilitating such operations is shown in FIG. 9B, below.

Block 712 may involve optionally removing stale configuration items. In some cases, all unattested configuration items are considered to be stale and manually marked as rejected. In other cases, a subset of such configuration items may be considered stale and manually marked as rejected. Rejected configuration items may be either manually deleted, or marked or scheduled for automatic deletion. Such marking may involve updating an attribute of the stale configuration items to indicate that they have been rejected and are considered stale. An automated job may execute periodically (e.g., once per day) or on demand to delete configuration items marked as rejected.

Figure 8:
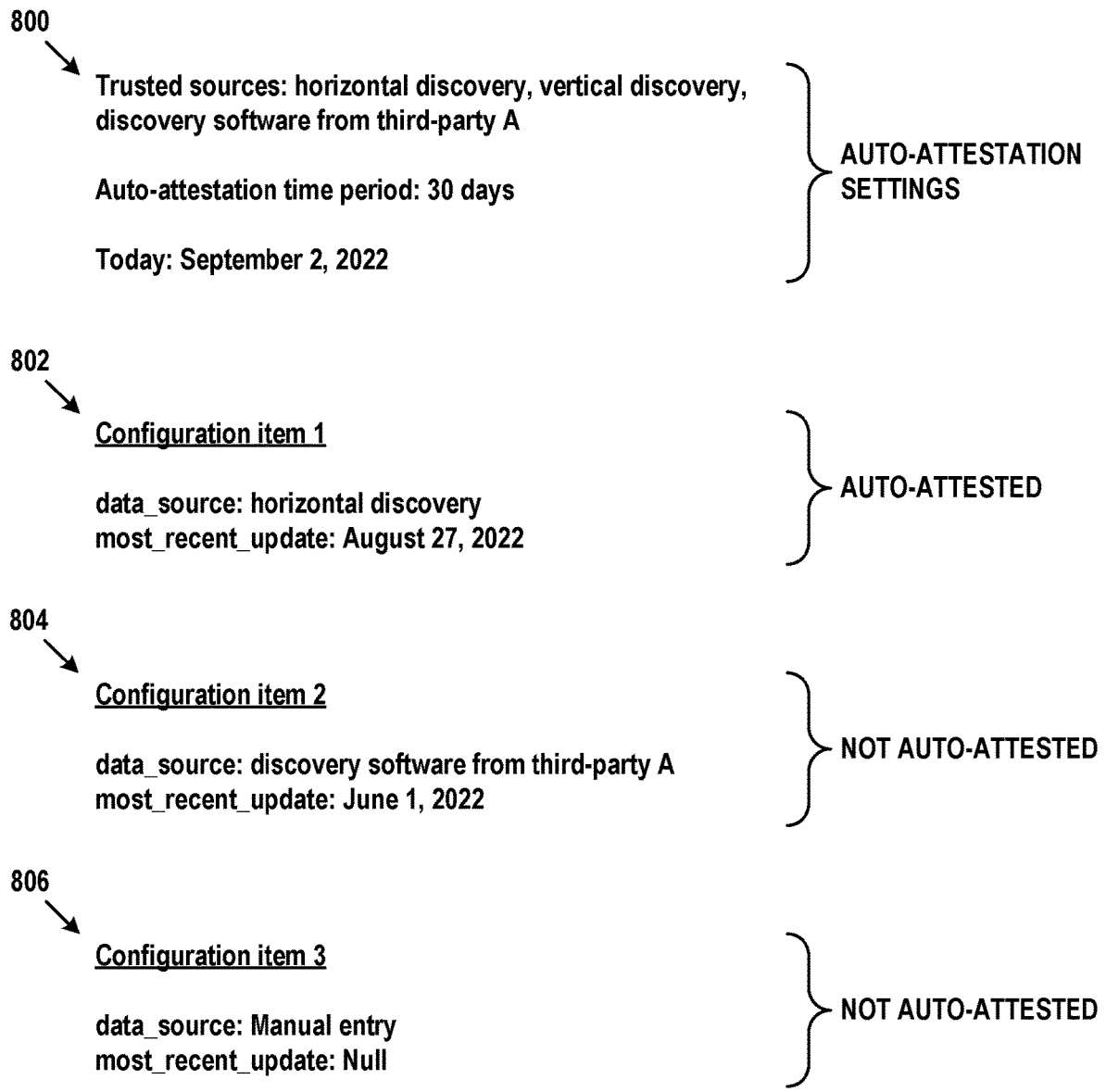
FIG. 8 depicts auto-attestation settings and results of performing auto-attestation on various configuration items, in accordance with example embodiments.

FIG. 8 provides examples of auto-attestation as it would be carried out on configuration items in accordance with the embodiments herein. In FIG. 8, block 800 provides configurable auto-attestation settings, while blocks 802, 804, and 806 represent specific configuration items.

Block 800 indicates that there are three trusted data sources: horizontal discovery, vertical discovery, and discovery software from third-party A. In practice, more or fewer trusted data sources may exist. Block 800 also indicates that the auto-attestation time period is 30 days. This time period defines what is considered to be a "recently updated" configuration item. In some cases, this time period could be as little as 1 day, as high as 365 days, or take on some other value. Block 800 also indicates that the current date is Sep. 2, 2022.

Block 802 shows the relevant attributes of configuration item 1. For this configuration item, the value of the data_source attribute is horizontal discovery, and the value of the most_recent_update attribute is Aug. 27, 2022. Since the data_source attribute indicates one of the trusted data sources and the most_recent_update attribute indicates a date that is within the auto-attestation time period (30 days) from current date, this configuration item is auto-attested.

Block 804 shows the relevant attributes of configuration item 2. For this configuration item, the value of the data_source attribute is discovery software from third-party A, and the value of the most_recent_update attribute is Jun. 1, 2022. The data_source attribute indicates one of the trusted data sources, but the most_recent_update attribute indicates a date that is not within the auto-attestation time period (30 days) from current date. Therefore, this configuration item is not auto-attested.

Block 806 shows the relevant attributes of configuration item 3. For this configuration item, the value of the data_source attribute is manual entry, and the value of the most_recent_update attribute is null (i.e., no value has been written to this attribute). The data_source attribute indicates one of the untrusted data sources, and the most_recent_update attribute does not indicate a date that is within the auto-attestation time period (30 days) from current date. Therefore, for both of these reasons, this configuration item is not auto-attested.

FIGS. 9A and 9B provide example graphical user interfaces that facilitate user interaction with auto-attestation procedures. Notably, these graphical user interfaces are for purposes of example, and other graphical arrangements with different data presented in varying ways may be used instead.

In FIG. 9A, graphical user interface 900 represents how a user might be prompted to review auto-attested configuration items, as described above in the context of block 708. Accordingly, a list of auto-attested configuration items is shown in the background, and the user is presented with dialog box 902 in the foreground. Dialog box 902 indicates that the user can review the auto-attested configuration items, cancel auto-attestation and conduct a manual review (thus leaving the auto-attested configuration items unattested), or accept the auto-attestation (thus marking the auto-attested configuration items as attested). The annotations at the bottom of FIG. 9A indicate that in this example 63 of 67 configuration items were auto-attested (i.e., by smart detection thereof) and that these 63 configuration items can be manually reviewed if desired.

In FIG. 9B, graphical user interface 910 represents how a user might be prompted to review non-auto-attested configuration items, as described above in the context of block 710. FIG. 9B continues the scenario of FIG. 9A, but focuses on the 4 configuration items that were not auto-attested. Each of these configuration items can be manually attested, left unattested, or marked as rejected. Rejected configuration items can be deleted by way of graphical user interface 910 or by a further scheduled job. The option for manual attestation is indicated by the annotations at the bottom of FIG. 9B, as is the observation that the auto-attestation procedures may record a log of how many configuration items were auto-attested on a particular date.

A. Data Certification of Configuration Items

In addition to or separately from auto-attestation, a computational instance may have one or more software applications that can be used for data certification of configuration items in a CMDB. In particular, this form of certification allows a user or administrator to specify that certain configuration item attributes take on one or one or more per-attribute pre-established values.

As an example, a certification may be to verify that configuration items that were recently updated by a trusted data source have a DNS_domain attribute of abc.com, are assigned to a specific group of users, and have a location of "San Diego". Other possibilities exist. For instance, regular expression or wild card values may be used to verify attributes that can be predictably different across various configuration items (e.g., all IP addresses are in the form 192.168.0.*, where the * is a wildcard value that by convention matches any integer from 0-255).

Not unlike auto-attestation, this data certification can be performed automatically, according to a schedule. Once such a job is completed, users may be presented with options to review the auto-certified configuration items, cancel auto-certification and conduct a manual review (thus leaving the auto-certified configuration items unattested), or accept the auto-certification (thus marking the auto-certified configuration items as attested).

The advantages of auto-certification are analogous to those of auto-attestation. A large number of configuration items can be certified as having the proper values for at least some of their attributes, and any non-conforming configuration items can be easily identified.

B. Using Machine Learning to Group Configuration Items for Review

As noted above, auto-attestation can produce a list of auto-attested configuration items for user review, and well as a separate list of non-auto-attested configuration items also for user review. Auto-certification procedures may produce analogous lists.

Reviewing these lists can be difficult to do when the lists scale up to hundreds, thousands, or even hundreds of thousands of configuration items. Manually grouping and/or filtering these lists can be effective in some cases, but is often a trial-and-error approach. For example, filtering may result in subsets of configuration items that are too small (e.g., less than 10) or too large (over 1,000). Furthermore, specifying a useful filter may require that certain configuration item attributes are properly populated and that the user knows of these attributes and their expected values.

As a solution to this problem, machine learning can be used to automatically group configuration items based on values of one or more of their attributes. Configuration items within such a group are likely to be similar to one another, or at least more similar to one another than to configuration items that were placed in a different group. Due to this, it is likely that users will attest (or certify) all configuration items in such a group rather than going through them one-by-one.

This machine learning based grouping may be supervised or unsupervised, and may be rules-based or without pre-established rules. In rules-based embodiments, rules may be developed that identify certain attributes to use as the basis of clustering. Thus, when two or more configuration items have similar values for these attributes, these configuration items are likely to be placed in the same. Embodiments without pre-established rules may consider any combination of attributes in the configuration items and form groups based on the values in these attributes.

Here, similarity can determined in various ways. Some may be based on trained neural networks and/or word vectors (where words are projected into a semantically-relevant m-dimensional space such that words with similar meanings are closer to one another in the m-dimensional space than words with less similar meanings).

In the embodiments herein, the degree of similarity between two sets of attributes can be determined by calculating a similarity measurement between their respective vector representations. One such measurement may be based on cosine similarity, which is defined by the following equations:

$$\text{similarity}\left(\vec{A}, \vec{B}\right) = \frac{\vec{A} \cdot \vec{B}}{\|\vec{A}\| \|\vec{B}\|}$$

where $$\|\vec{A}\| = \sqrt{A_1^2 + A_2^2 + A_3^2 + \ldots + A_m^2}, \text{ and}$$

$$\|\vec{B}\| = \sqrt{B_1^2 + B_2^2 + B_3^2 + \ldots + B_m^2}$$

In these equations, vector A could represent one input vector and vector B could represent another input vector, each of which could be derived from sets of attributes, for example. Vector A and vector B could both be of dimension m. The similarity calculation may have an output a number between $-1.0$ and $+1.0$, where the closer this result is to $+1.0$, the more similar vectors A and B are to each other.

Other models may employ an attention mechanism (focusing on a few modules of a neural network while largely ignoring others), which has recently been shown to outperform generic neural networks on certain natural language processing tasks. Additional techniques may be possible.

VII. EXAMPLE OPERATIONS

Figure 10:
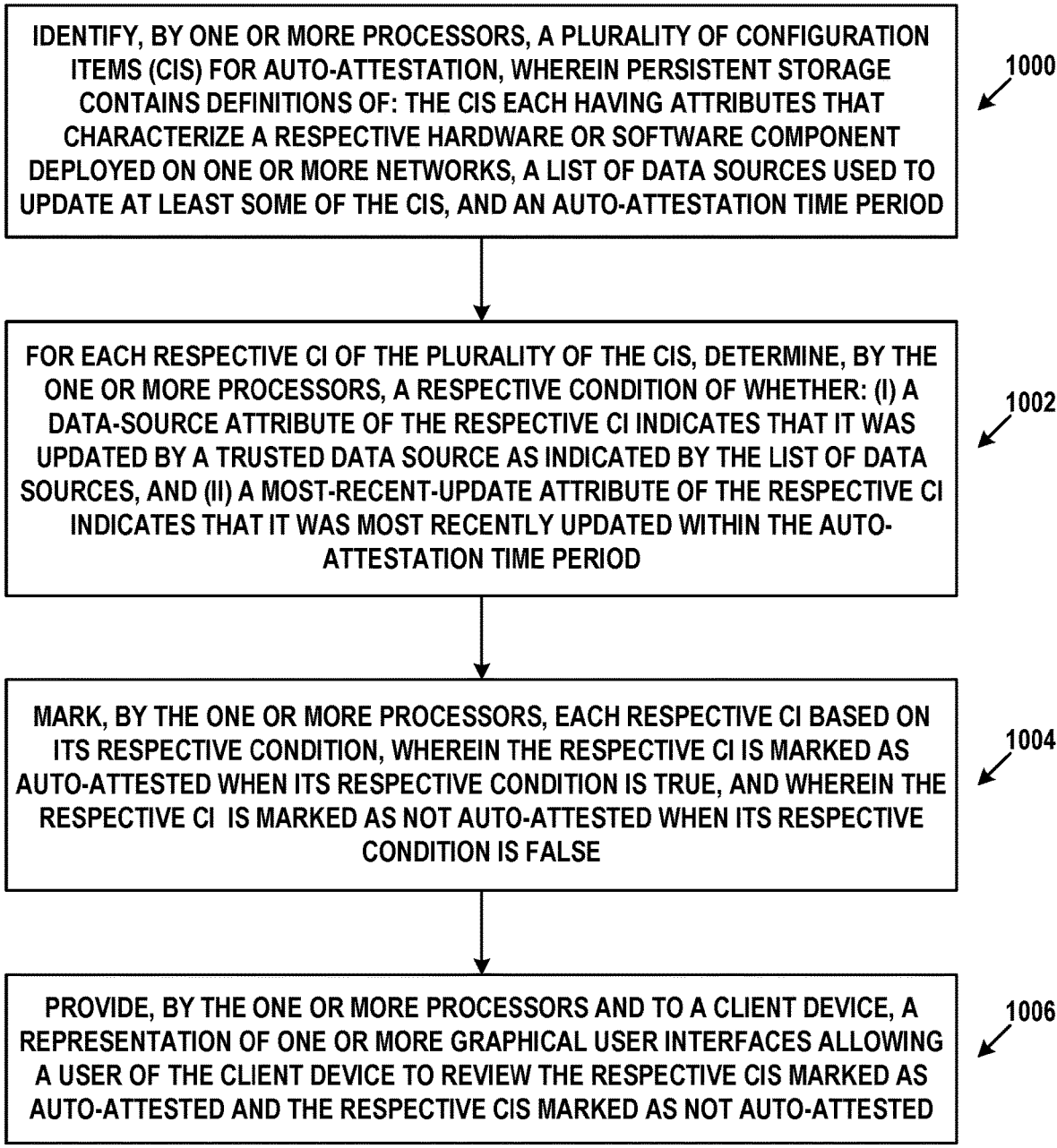
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve identifying, by one or more processors, a plurality of configuration items (CIs) for auto-attestation, wherein persistent storage contains definitions of: the CIs each having attributes that characterize a respective hardware or software component deployed on one or more networks, a list of data sources used to update at least some of the CIs, and an auto-attestation time period.

Block 1002 may involve, for each respective CI of the plurality of the CIs, determining, by the one or more processors, a respective condition of whether: (i) a data-source attribute of the respective CI indicates that it was updated by a trusted data source as indicated by the list of data sources, and (ii) a most-recent-update attribute of the respective CI indicates that it was most recently updated within the auto-attestation time period.

Block 1004 may involve marking, by the one or more processors, each respective CI based on its respective condition, wherein the respective CI is marked as auto-attested when its respective condition is true, and wherein the respective CI is marked as not auto-attested when its respective condition is false.

Block 1006 may involve providing, by the one or more processors and to a client device, a representation of one or more graphical user interfaces allowing a user of the client device to review the respective CIs marked as auto-attested and the respective CIs marked as not auto-attested.

In some embodiments, identifying the plurality of the CIs for auto-attestation comprises applying a user-defined filter to all of the CIs in the persistent storage.

In some embodiments, the identifying, determining, and marking occurs periodically in accordance with a user-defined schedule.

In some embodiments, the list of data sources identifies trusted data sources, wherein determining whether the data-source attribute of the respective CI indicates that it was updated by the trusted data source as indicated by the list of data sources comprises determining that a data source indicated by the data-source attribute of the respective CI is in the list of data sources.

In some embodiments, the trusted data source is a software application that has probed each respective CI to verify its reachability or operational status.

In some embodiments, the list of data sources identifies non-trusted data sources, wherein determining whether the data-source attribute of the respective CI indicates that it was updated by the trusted data source as indicated by the list of data sources comprises determining that a data source indicated by the data-source attribute of the respective CI is not in the list of data sources.

In some embodiments, the auto-attestation time period is between 5 and 90 days.

In some embodiments, providing the representation of one or more graphical user interfaces comprises: using a rules-based or machine-learning similarity model, dividing the respective CIs marked as auto-attested into groups based on determined similarities of their attributes; and separately providing representations of each of the groups for the user of the client device to review.

In some embodiments, providing the representation of one or more graphical user interfaces comprises: using a rules-based or machine-learning similarity model, dividing the respective CIs marked as not auto-attested into groups based on determined similarities of their attributes; and separately providing representations of each of the groups for the user of the client device to review.

In some embodiments, the one or more processors are further configured to: identify a further plurality of the CIs for auto-certification; for each further respective CI of the further plurality of the CIs, determine a further respective condition of whether one or more attributes of the further respective CI have respectively pre-defined values, wherein the respectively pre-defined values indicate that the further respective CI is properly populated; and mark each further respective CI based on its further respective condition, wherein the further respective CI is marked as auto-certified when its further respective condition is true, and wherein the respective CI is marked as not auto-certified when its further respective condition is false.

Some embodiments may further involve: receiving, by way of the one or more graphical user interfaces, a command from the user to accept auto-attestation of a set of the respective CIs that were marked as auto-attested; and in response to receiving the command, writing, to the persistent storage, that the set of the respective CIs are attested.

Some embodiments may further involve deleting, from the persistent storage, one or more of the respective CIs that were not marked as auto-attested.

Some embodiments may further involve receiving, by way of the one or more graphical user interfaces, a command from the user to delete the one or more of the respective CIs that were not marked as auto-attested, wherein deleting one or more of the respective CIs that were not marked as auto-attested occurs in response to receiving the command.

VIII. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system for faster attestation of configuration items and removal of non-attested items by bulk auto-attestation comprising:
    persistent storage containing definitions of: configuration items (CIs) each having attributes that characterize a respective hardware or software component deployed on one or more networks, a list of data sources used to update at least some of the CIs, and an auto-attestation time period; and
    one or more processors configured to:
        identify a plurality of the CIs for auto-attestation;
        for each respective CI of the plurality of the CIs, determine a respective (i) first condition of whether a data-source attribute of the respective CI indicates that it was updated by a trusted data source as indicated by the list of data sources, and (ii) second condition of whether a most-recent-update attribute of the respective CI indicates that it was most recently updated within the auto-attestation time period;
        mark each respective CI based on its respective first and second conditions, wherein the respective CI is marked as auto-attested when its respective first condition and second condition are both true, and wherein the respective CI is marked as not auto-attested when its respective first condition or second condition is false;
        provide, to a client device, a representation of one or more graphical user interfaces allowing a user of the client device to review the respective CIs marked as auto-attested and the respective CIs marked as not auto-attested, wherein at least one of the one or more graphical user interfaces includes at least one element to accept a set of the respective CIs that were marked as auto-attested as a group;
        receive a command from the client device to accept auto-attestation of the set of the respective CIs that were marked as auto-attested;
        in response to receiving the command, write, to the persistent storage, that the set of the respective CIs are attested; and
        receive, from the client device, a manual attestation for at least one of the respective CIs marked as not auto-attested, wherein the manual attestation comprises a verification of a presence or operation of at least one of the respective CIs marked as not auto-attested.

2. The system of claim 1, wherein identifying the plurality of the CIs for auto-attestation comprises applying a user-defined filter to all of the CIs in the persistent storage.

3. The system of claim 1, wherein the identifying, determining, and marking occurs periodically in accordance with a user-defined schedule.

4. The system of claim 1, wherein the list of data sources identifies trusted data sources, and wherein determining whether the data-source attribute of the respective CI indicates that it was updated by the trusted data source as indicated by the list of data sources comprises determining that a data source indicated by the data-source attribute of the respective CI is in the list of data sources.

5. The system of claim 1, wherein the trusted data source is a software application that has probed each respective CI to verify its reachability or operational status.

6. The system of claim 1, wherein the list of data sources identifies non-trusted data sources, and wherein determining whether the data-source attribute of the respective CI indicates that it was updated by the trusted data source as indicated by the list of data sources comprises determining that a data source indicated by the data-source attribute of the respective CI is not in the list of data sources.

7. The system of claim 1, wherein the auto-attestation time period is between 5 and 90 days.

8. The system of claim 1, wherein providing the representation of one or more graphical user interfaces comprises:
    using a rules-based or machine-learning similarity model, dividing the respective CIs marked as auto-attested into groups based on determined similarities of their attributes; and
    separately providing representations of each of the groups for the user of the client device to review.

9. The system of claim 1, wherein providing the representation of one or more graphical user interfaces comprises:
    using a rules-based or machine-learning similarity model, dividing the respective CIs marked as not auto-attested into groups based on determined similarities of their attributes; and
    separately providing representations of each of the groups for the user of the client device to review.

10. The system of claim 1, wherein the one or more processors are further configured to:
    identify a further plurality of the CIs for auto-certification;
    for each further respective CI of the further plurality of the CIs, determine a further respective condition of whether one or more attributes of the further respective CI have respectively pre-defined values, wherein the respectively pre-defined values indicate that the further respective CI is properly populated; and
    mark each further respective CI based on its further respective condition, wherein the further respective CI is marked as auto-certified when its further respective condition is true, and wherein the respective CI is marked as not auto-certified when its further respective condition is false.

11. The system of claim 1, wherein the one or more processors are further configured to:
    receive, by way of the one or more graphical user interfaces, a command from the user to accept auto-attestation of a set of the respective CIs that were marked as auto-attested; and
    in response to receiving the command, write, to the persistent storage, that the set of the respective CIs are attested.

12. The system of claim 1, wherein the one or more processors are further configured to:
    delete, from the persistent storage, one or more of the respective CIs that were not marked as auto-attested.

13. The system of claim 12, wherein the one or more processors are further configured to:

receive, by way of the one or more graphical user interfaces, a command from the user to delete the one or more of the respective CIs that were not marked as auto-attested, wherein deleting one or more of the respective CIs that were not marked as auto-attested occurs in response to receiving the command.

14. A computer-implemented method for faster attestation of configuration items and removal of non-attested items by bulk auto-attestation comprising:

identifying, by one or more processors, a plurality of configuration items (CIs) for auto-attestation, wherein persistent storage contains definitions of: the CIs each having attributes that characterize a respective hardware or software component deployed on one or more networks, a list of data sources used to update at least some of the CIs, and an auto-attestation time period;

for each respective CI of the plurality of the CIs, determining, by the one or more processors, a respective (i) first condition of whether a data-source attribute of the respective CI indicates that it was updated by a trusted data source as indicated by the list of data sources, and (ii) second condition of whether a most-recent-update attribute of the respective CI indicates that it was most recently updated within the auto-attestation time period;

marking, by the one or more processors, each respective CI based on its respective first and second conditions, wherein the respective CI is marked as auto-attested when its respective first condition and second condition are both true, and wherein the respective CI is marked as not auto-attested when its respective first condition or second condition is false;

providing, by the one or more processors and to a client device, a representation of one or more graphical user interfaces allowing a user of the client device to review the respective CIs marked as auto-attested and the respective CIs marked as not auto-attested, wherein at least one of the one or more graphical user interfaces includes at least one element to accept a set of the respective CIs that were marked as auto-attested as a group;

receiving a command from the client device to accept auto-attestation of the set of the respective CIs that were marked as auto-attested;

in response to receiving the command, writing, to the persistent storage, that the set of the respective CIs are attested; and receiving, from the client device, a manual attestation for at least one of the respective CIs marked as not auto-attested, wherein the manual attestation comprises a verification of a presence or operation of at least one of the respective CIs marked as not auto-attested.

15. The computer-implemented method of claim 14, wherein the list of data sources identifies trusted data sources, and wherein determining whether the data-source attribute of the respective CI indicates that it was updated by the trusted data source as indicated by the list of data sources comprises determining that a data source indicated by the data-source attribute of the respective CI is in the list of data sources.

16. The computer-implemented method of claim 14, wherein the trusted data source is a software application that has probed each respective CI to verify its reachability or operational status.

17. The computer-implemented method of claim 14, wherein the list of data sources identifies non-trusted data sources, and wherein determining whether the data-source attribute of the respective CI indicates that it was updated by the trusted data source as indicated by the list of data sources comprises determining that a data source indicated by the data-source attribute of the respective CI is not in the list of data sources.

18. The computer-implemented method of claim 14, wherein providing the representation of one or more graphical user interfaces comprises:

using a rules-based or machine-learning similarity model, dividing the respective CIs marked as auto-attested into groups based on determined similarities of their attributes; and separately providing representations of each of the groups for the user of the client device to review.

19. The computer-implemented method of claim 14, further comprising:

identifying a further plurality of the CIs for auto-certification;

for each further respective CI of the further plurality of the CIs, determining a further respective condition of whether one or more attributes of the further respective CI have respectively pre-defined values, wherein the respectively pre-defined values indicate that the further respective CI is properly populated; and marking each further respective CI based on its further respective condition, wherein the further respective CI is marked as auto-certified when its further respective condition is true, and wherein the respective CI is marked as not auto-certified when its further respective condition is false.

20. An article of manufacture including a non-transitory computer-readable medium, having stored thereon program instructions that, upon execution by a computing system, cause the computing system to perform operations for faster attestation of configuration items and removal of non-attested items by bulk auto-attestation comprising:

identifying, by one or more processors, a plurality of configuration items (CIs) for auto-attestation, wherein persistent storage contains definitions of: the CIs each having attributes that characterize a respective hardware or software component deployed on one or more networks, a list of data sources used to update at least some of the CIs, and an auto-attestation time period;

for each respective CI of the plurality of the CIs, determining, by the one or more processors, a respective (i) first condition of whether a data-source attribute of the respective CI indicates that it was updated by a trusted data source as indicated by the list of data sources, and (ii) a second condition of whether a most-recent-update attribute of the respective CI indicates that it was most recently updated within the auto-attestation time period;

marking, by the one or more processors, each respective CI based on its respective first and second conditions, wherein the respective CI is marked as auto-attested when its respective first condition and second condition are both true, and wherein the respective CI is marked as not auto-attested when its respective first condition or second condition is false;

providing, by the one or more processors and to a client device, a representation of one or more graphical user interfaces allowing a user of the client device to review the respective CIs marked as auto-attested and the respective CIs marked as not auto-attested, wherein at least one of the one or more graphical user interfaces includes at least one element to accept a set of the respective CIs that were marked as auto-attested as a group;

receiving a command from the client device to accept auto-attestation of the set of the respective CIs that were marked as auto-attested;

in response to receiving the command, writing, to the persistent storage, that the set of the respective CIs are attested; and receiving, from the client device, a manual attestation for at least one of the respective CIs marked as not auto-attested, wherein the manual attestation comprises a verification of a presence or operation of at least one of the respective CIs marked as not auto-attested.

\* \* \* \* \*